United States Patent [19]

Allen et al.

[11] 4,436,478

[45] Mar. 13, 1984

[54] APPARATUS FOR MAKING MOLDED ARTICLES

[75] Inventors: Roland M. Allen, Kenilworth; Andrew J. Kalocai, Pottstown, both of Pa.

[73] Assignee: The West Company, Phoenixville, Pa.

[21] Appl. No.: 464,281

[22] Filed: Feb. 7, 1983

Related U.S. Application Data

[60] Division of Ser. No. 286,977, Jul. 27, 1981, abandoned, which is a continuation of Ser. No. 142,028, Apr. 21, 1980, abandoned, which is a continuation of Ser. No. 13,252, Feb. 21, 1979, abandoned, which is a continuation of Ser. No. 743,071, Nov. 18, 1976, abandoned, which is a division of Ser. No. 473,216, May 24, 1974, abandoned.

[51] Int. Cl.³ ............................ A61J 1/06; B29H 3/06
[52] U.S. Cl. .................................. 414/752; 414/736; 425/305.1
[58] Field of Search .......... 414/121, 404, 416, 744 B, 414/752, 736, 737; 425/289, 305.1, 317, 403.1, 453, 809; 83/561

[56] References Cited

U.S. PATENT DOCUMENTS

| | | | |
|---|---|---|---|
| 1,574,564 | 2/1926 | Farnsworth | 425/305.1 X |
| 2,230,189 | 1/1941 | Ferngren | 425/305.1 X |
| 2,688,776 | 9/1954 | Evans | 425/305.1 X |
| 3,318,068 | 5/1967 | Voullaire | 414/749 X |
| 3,716,147 | 2/1973 | Pipes | 414/627 |
| 3,974,919 | 8/1976 | Bokalders | 414/753 X |

*Primary Examiner*—Robert J. Spar
*Assistant Examiner*—Terrance L. Siemens
*Attorney, Agent, or Firm*—Eugene E. Renz, Jr.

[57] ABSTRACT

Apparatus for handling a plurality of clad elements of a predetermined configuration formed from a sheet consisting of a layer of an elastomeric material bonded to a layer of inert material and deposited in openings of a die corresponding in number and arrangement to cavities of a mold. The apparatus has a transfer mechanism with a plurality of rods having a pickup face with at least one fluid port. The rods correspond in number and array to the die openings and mold cavities. The fluid port is connected to a source of vacuum to retain a clad element on the pickup face when it engages the element in the die openings and to an air pressure source to discharge the clad element in the cavity of the mold. The apparatus further includes a reciprocating punch having a plurality of punch rods for forming the clad elements from the sheet material and depositing them in the openings of the die. The said die and mold are positioned adjacent one another. The mechanism is adapted for translating movement between a first position overlying the die with the punch rods aligned with the die openings and a second position overlying the mold with the pickup rods aligned with the mold cavities.

3 Claims, 18 Drawing Figures

U.S. Patent   Mar. 13, 1984   Sheet 1 of 4   4,436,478
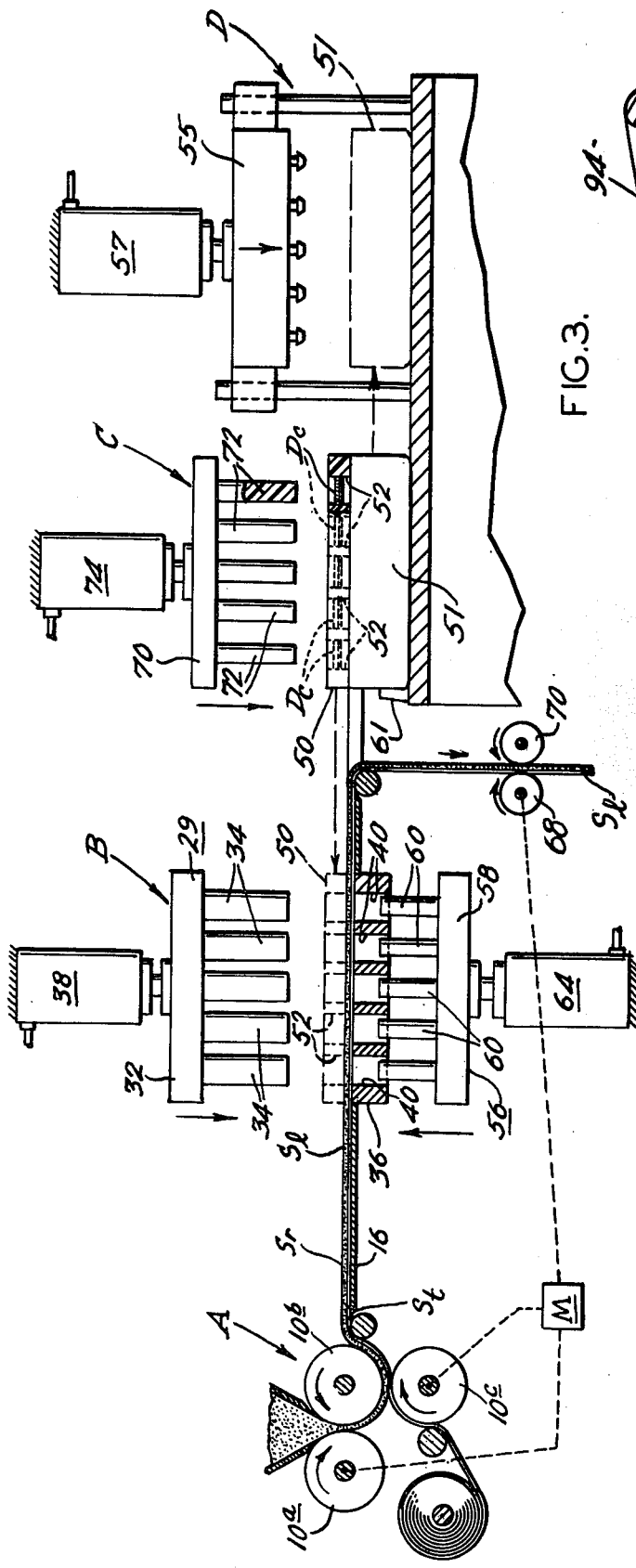

APPARATUS FOR MAKING MOLDED ARTICLES

This is a division of application Ser. No. 286,977, filed July 27, 1981, now abandoned, which is a continuation of application Ser. No. 142,028, filed Apr. 21, 1980, now abandoned, which is a continuation of Ser. No. 013,252, filed Feb. 21, 1979, now abandoned, which is a continuation of Ser. No. 743,071, filed Nov. 18, 1976, now abandoned, which is a division of Ser. No. 473,216, filed May 24, 1974, now abandoned.

The present invention relates to molded articles, and more specifically, to molded articles comprised of an elastomeric material, such as rubber and having a facing or liner of an inert material such as Teflon* and to a novel method, system and apparatus for making such articles.

*a trademark of E. I. DuPont de Nemours for tetraflourethylene polymer

An example of an article made in accordance with the present invention is a container closure or stopper for use on containers such as bottles for packaging a medicament which is adapted to be withdrawn from the container by a syringe for injection into a patient. Typically these closures are made of an elastomeric material such as rubber, and include a top portion which overlies the axial end face of the container and a plug or body portion which depends into the opening in sealing relation with the inner side wall of the container defining the opening. An outer cap and cover assembly normally holds the stopper in place, the cap having a detachable central disc portion which is removeable upon actuation of the cover to expose the center of the closure so that it may be pierced by the needle of a hypodermic syringe to withdraw the contents when desired. These prior closures, which are usually entirely formed of rubber, are generally satisfactory from the standpoint of hermetically sealing the container prior to use of the contents by withdrawal by means of the syringe. The rubber also reseals the puncture opening formed by the needle to reseal the contents when less than the entire contents of the container are withdrawn at any one time. However, it has been found that some medicaments react chemically with the rubber stopper and are consequently therapeutically unsatisfactory.

In view of the above, it has been proposed to provide the axial end face of the plug portion of the stopper which confronts the contents with a facing or liner made of a chemically inert material such as Teflon. However, considerable difficulty has been encountered in providing a suitable bond between the Teflon liner and the rubber stopper, particularly in the case of a stopper having a depending plug portion where it is necessary to provide a return skirt on the liner which engages with the side wall of the opening in the container to insure a complete inert barrier between the contents and the stopper to block any leakage path between the medicament and rubber portion of the stopper.

In some instances, the Teflon liner has been secured to the axial end face of the stopper by means of an adhesive. These stoppers are generally flat, disc-like in design wherein the liner engages the axial end face of the container defining the opening. While this method provides a generally suitable bond between the Teflon and rubber, it has been found that when the stopper is pierced by the needle of a syringe, there is the danger that adhesive particles may be entrained in the medicament drawn into the syringe which may be injected into the patient and be harmful.

It has also been proposed to laminate the Teflon directly to the stopper during the molding process by inserting a sheet of Teflon material between the mold sections. This process has not been entirely satisfactory for making stoppers wherein the liner has a return skirt as illustrated, for example, in FIGS. 11 and 15 for the reason that air bubbles are formed between the sheet and the rubber during the vulcanization process and consequently, the Teflon tends to peel since the bond is not adequate. Additionally, it has been found that the Teflon tends to pucker or wrinkle at the return skirt thereby providing small channels or leakage paths through which the medicament can penetrate to contact the rubber portion of the stopper. Thus, the danger of chemical reaction between the medicament and the rubber portion of the stopper is not completely obviated in these assemblies.

The present invention may also be effectively utilized in providing a liner on the piston-plunger of a syringe assembly to provide the same advantages noted above. For example, in a syringe, a lined piston-plunger insures integrity of the medicament and obviates any chemical reaction which may take place with certain medicaments and rubber plunger assemblies, and thus provides a syringe which has a longer shelf life potential.

With the foregoing in mind, an object of the present invention is to provide a novel method or process for manufacturing the articles such as closures or piston plungers of the above type made of an elastomeric material such as rubber, and having a liner made of an inert material such as Teflon. The method broadly consists of laminating a thin sheet of elastomeric material such as uncured rubber, to one face of a thin sheet of inert material such as Teflon, the said one face of the Teflon being chemically etched to produce a static cling to securely adhere the sheets together. Thereafter, the laminated sheet is cut into a plurality of circular discs of a predetermined size to form the liner facing in the finished article. The discs are then forced into mold cavities for the article to be manufactured. Thereafter, additional elastomeric material is placed into the mold and molded in a conventional manner.

In apparatus for performing the process described as it applies to the manufacture of stopper type closures, the Teflon clad discs are deposited in a plurality of pockets in a loading rack, the pockets being of a number corresponding to the number of cavities in a mold for making the closures and being oriented to register with the mold cavities when the loading rack is superimposed over the mold. In one form of loading rack each pocket has an entrance or pilot opening of a size to receive the clad disc, and a reduced throat area of a smaller diameter than the pilot portion and defining at the juncture a seat on which the clad disc is supported in the loading rack. When the loading rack has been moved in registry with the mold, the discs are simultaneously transferred to the mold cavity by a plurality of knockout pins which press the clad disc through the throat portion of the loading rack and which accurately locate the clad disc in the bottom of the mold cavity. Thereafter, the loading rack is removed and the mold cavity charged with additional uncured elastomeric material. The top half of the mold is then positioned in place and the stopper molded in the conventional manner.

It has been found that during the molding process, the Teflon liner is intimately bonded to the stopper, and the return skirt is essentially free of any wrinkles which may cause leakage paths thus providing an effective seal and an inert barrier when the article is a stopper or plunger as described above. The rubber layer of the clad disc and the rubber of the main portion of the article may be of the same grade or different grades, which are compatible for molding purposes. In either event, the elastomeric material may be standardized for stoppers used on containers for various types of medicaments by reason of the effective barrier provided, and thus, provide economy in the cost of the finished article. The system also facilitates color coding of articles for identification purposes by simply adding a coloring agent to the rubber for the clad disc.

These and other objects of the present invention and the various features and details of the method for manufacturing lined articles in accordance with the present invention are hereinafter more fully set forth with reference to the accompanying drawings, wherein;

FIG. 1 is a schematic view illustrating method and system for making lined molded articles in accordance with the present invention;

FIG. 2 is a sectional view of a container-closure assembly incorporating a stopper type closure made in accordance with the present invention;

FIG. 3 is a side elevational view partly in section of a two compartment syringe assembly incorporating a piston-plunger constructed in accordance with the present invention;

Figure 10:
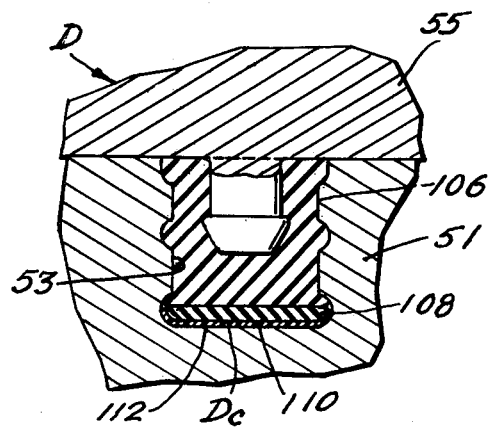
Figure 11:
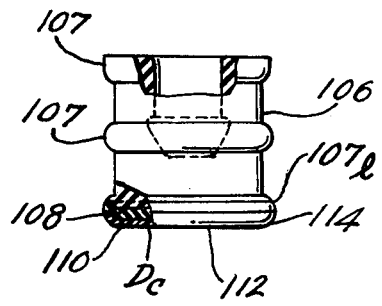
Figure 12:
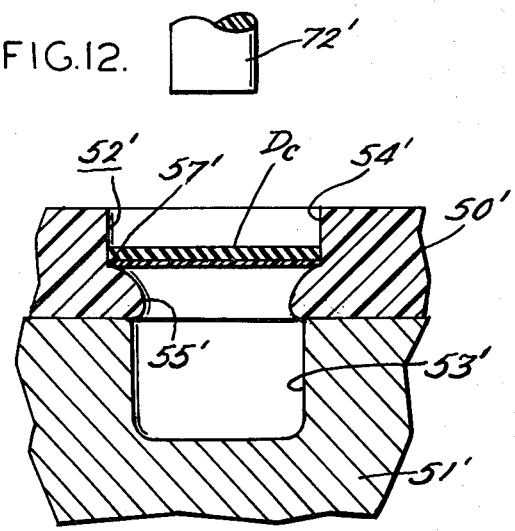
Figure 13:
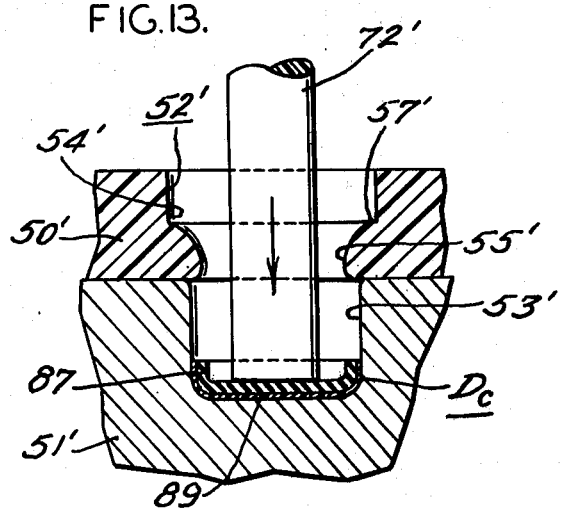
Figure 14:
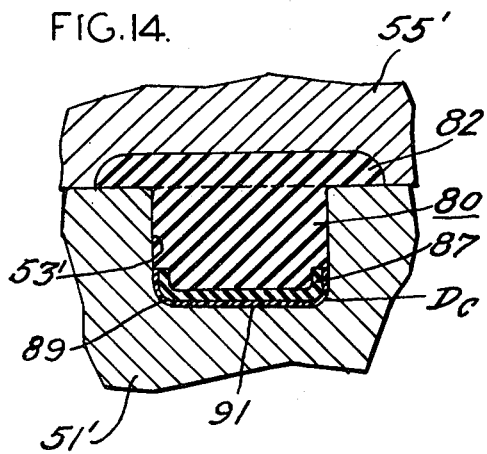
Figure 15:
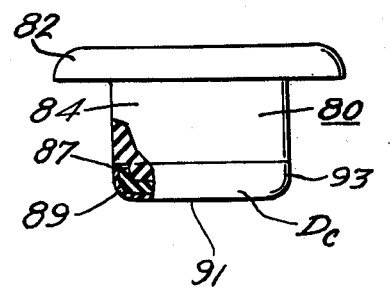
Figure 16:
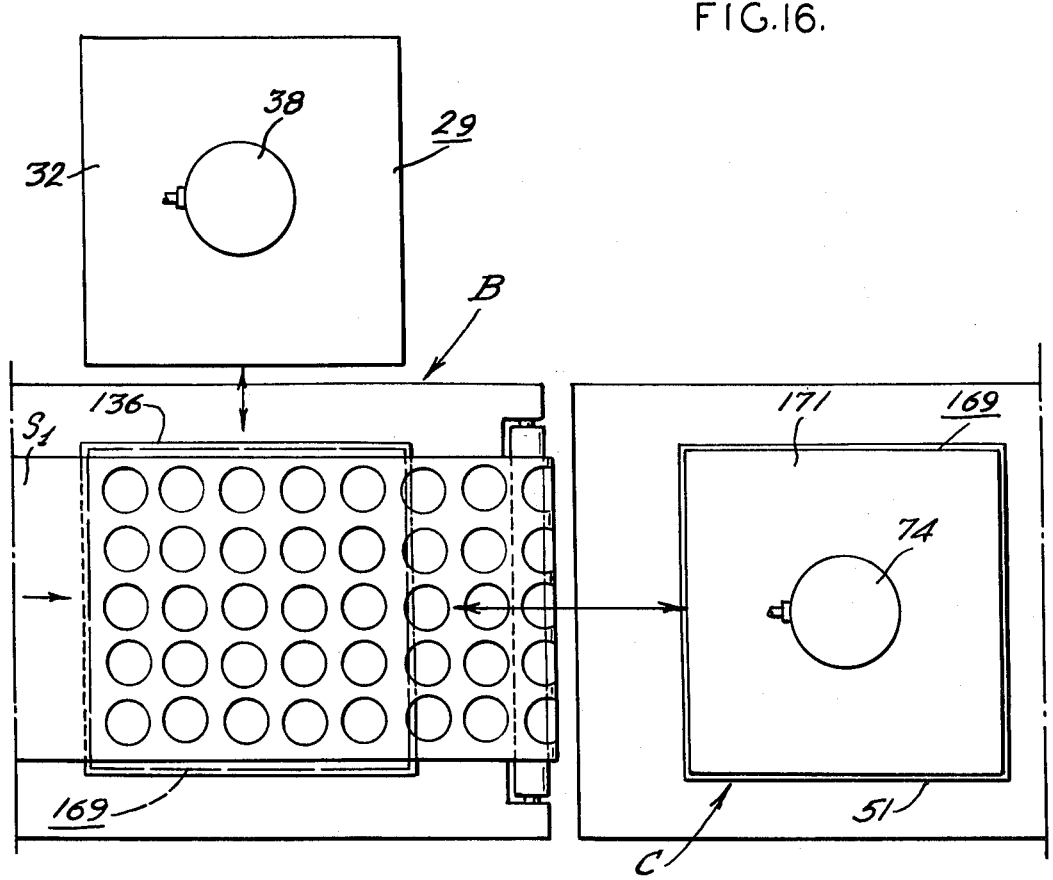
Figure 17:
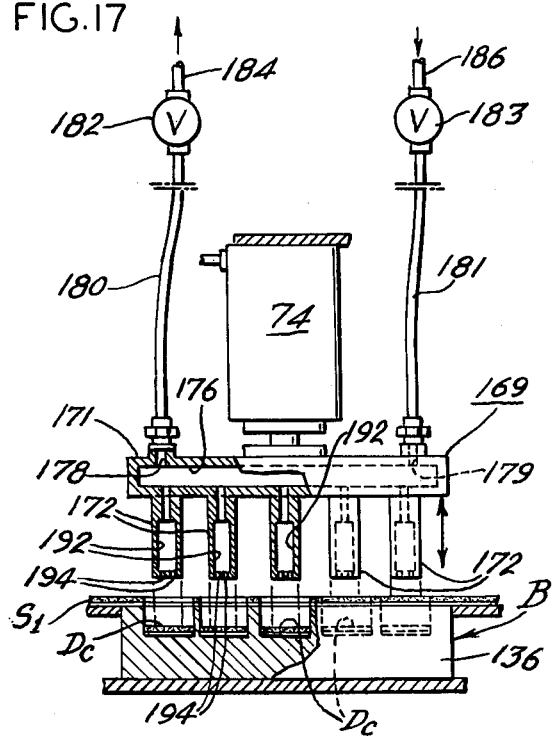
Figure 18:
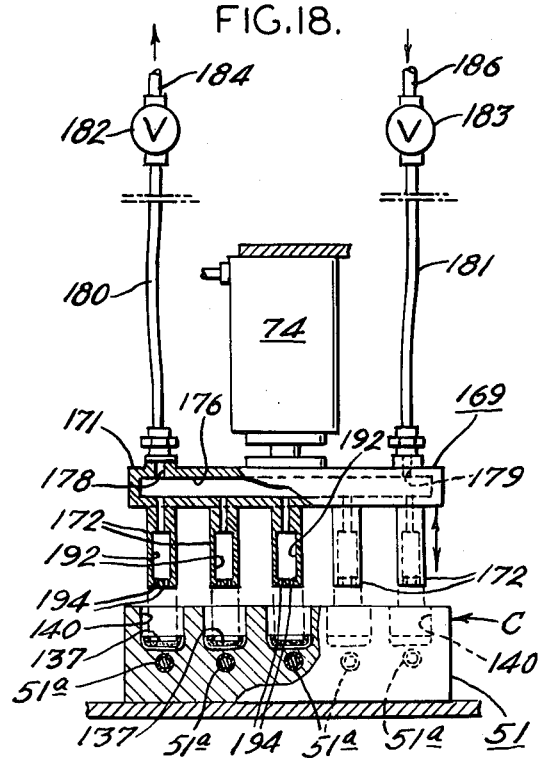

FIGS. 6-9 inclusive are enlarged sectional views showing the clad disc being transferred to the loading rack and then to the mold cavity;

FIG. 10 is an enlarged sectional view of the article illustrated in FIG. 2 in the mold cavity;

FIG. 11 is a side elevational view partly in section of a piston-plunger made in accordance with the present invention;

FIGS. 12 and 13 are enlarged sectional views showing a modified form of the loading rack;

FIG. 14 is an enlarged sectional view through the upper and lower halve of a mold for making the stopper type closure of FIG. 3;

FIG. 15 is a side elevational view partly in section of a stopper type closure made in accordance with the present invention;

FIG. 16 is a schematic plan view of the clad disc forming station and mold loading station for an alternate form of a modified punch clad disc transfer and mold loading mechanism; and FIGS. 17 and 18 are views partly in section of the alternate form of clad disc transfer and mold loading mechanism at the forming and loading stations respectively.

Referring now to the drawings and particularly to FIG. 1 thereof, there is illustrated schematically a system for making molded articles in accordance with the present invention. Even though the system and apparatus are set forth and described in connection with the manufacture of articles molded of an elastomeric material such as rubber, having a liner made of an inert material such as Teflon, it is understood that these articles may be made of elastomeric materials and inert materials other than those specifically discussed and set forth in the examples herein.

It is further understood that the system has application to manufacturing articles other than stopper type closures or piston plungers. The term "elastomeric" as used herein includes all substances having the properties of natural, reclaimed, vulcanized or synthetic rubber and the term "inert" as used herein includes any substance or material that is resistant to chemical or physical action.

In the method according to the present invention, a sheet of elastomeric material is bonded to a sheet of inert material to form a laminated sheet from which clad discs are formed. These clad discs are then transferred and positioned in a mold for molding the finished article.

To provide an initial understanding of the method of the present invention, a description of the basic components thereof in terms of function will be presented. Referring now to the drawings, and particularly to FIG. 1 thereof, elastomeric material is produced in sheet form $S_r$ and laminated to a sheet $S_t$ of inert material at a supply and sheet forming station A. The laminated sheet $S_1$ is then fed to a clad disc forming and transfer station B wherein clad discs $D_c$ are formed from the laminated sheet $S_1$ by means of a punch and die mechanism and then transferred to a loading rack by means of a transfer mechanism. The filled loading rack is then moved from the forming and transfer station B to a mold loading station C where the clad discs $D_c$ in the loading rack are discharged into the mold for the finished article. Thereafter, the mold is transferred and charged with additional elastomeric material to produce the finished product at the molding or vulcanizing station D.

With the above general description of the method or system in mind, the method will now be considered in detail. At the supply station A, a supply of elastomeric material, such as uncured rubber stock prepared in the conventional manner is formed into sheet stock on a conventional three-roll calender including a series of rolls 10a, 10b, and 10c. The uncured rubber stock may be fed to the nip of the forming rolls 10a and 10b and is bonded to a sheet $S_t$ of inert material fed to the nip of the rolls 10b and 10c. These rolls are rotated in the directions indicated by suitable drive actuator means such as the motor M and suitable transmission means connecting the output of the motor M to the calender rolls.

For example, in the present instance, a continuous sheet $S_r$ of uncured rubber is produced of a predetermined thickness of approximately 0.05 inches and of a suitable width related to the number of openings in the lateral rows of the punch and die mechanism. The sheet $S_t$ of inert material is preferably a Teflon film of a thickness of between 0.002 and 0.003 inches which is chemically etched on one face thereof, and is commercially available from E. I. DuPont de Nemours as FEP type 200C. This material is a tough, flexible but non-resilient material. The Teflon sheet $S_t$ with the chemically etched surface facing upwardly and the uncured rubber sheet $D_r$, are brought into confronting relation and bonded in the calender to form a laminated sheet $S_1$. The chemically etched face on the Teflon produces a "static cling" which enables it to adhere to the uncured rubber sheet $S_r$.

Figure 4:
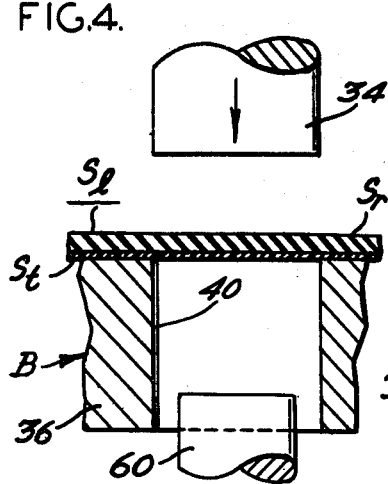
FIGS. 4 and 5 are enlarged sectional views showing sequentially the operations for forming the clad or laminated disc at the disc forming station of FIG. 1.
Figure 5:
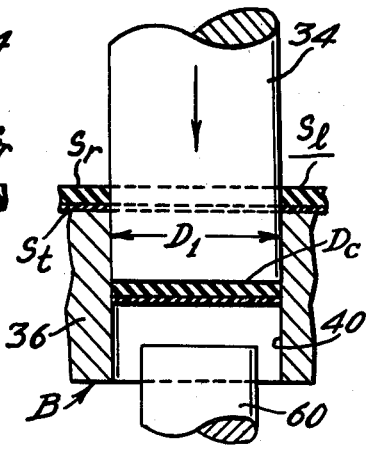
Figure 6:
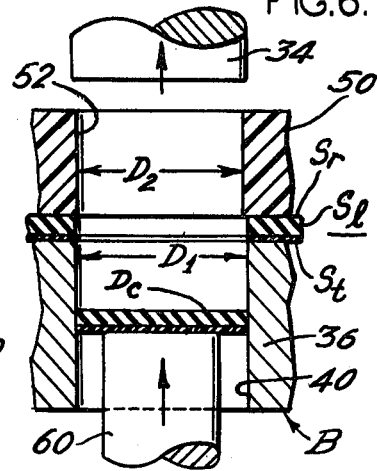
Figure 7:
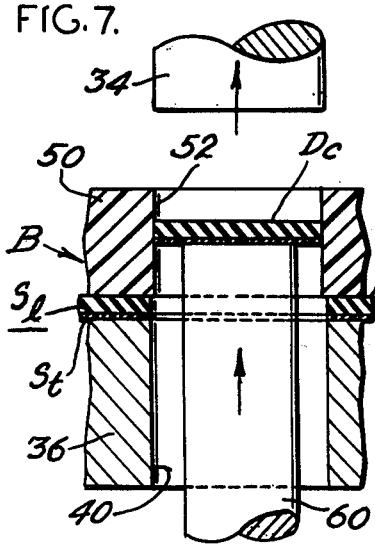
Figure 8:
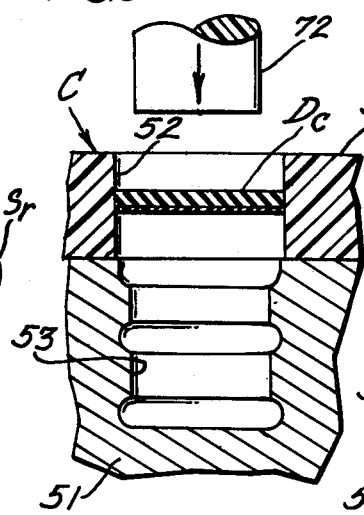

The laminated sheet $S_1$ is then advanced to the forming and transfer station B where apparatus is provided for blanking the laminated sheet $S_1$ to form a plurality of clad discs $D_c$. In the present instance, the apparatus is a punch and die mechanism. The punch 29 comprises a platen 32 mounting a plurality of generally cylindrical depending punch rods 34, and is adapted for reciprocating movement by means of a piston cylinder actuator 38 between a retracted position (see FIG. 1) and a lowered position wherein the rods enter aligned openings in a die 36 to produce the clad discs. (See FIG. 5.) Thus, when the laminated sheet $S_1$ is positioned over the openings 40 in the die 36 (See FIG. 4), the platen 32 is actuated downwardly by the piston cylinder actuator 38 whereby as the punch rods enter the die openings 40, a shearing or scissoring action takes place at the edge of the opening to sever a series of clad discs $D_c$ from the sheet material in the manner illustrated in FIGS. 4 and 5. When the punch 29 is retracted, the loading rack is brought into position at the transfer station B to permit clad discs $D_c$ to be transferred thereto. The loading rack 50 is provided with a plurality of circular openings 52 corresponding in number to the number of openings 40 in the punch die 36 and suitable indexing means is provided on the loading rack and die 36 so that the loading rack may be positioned over the die with the openings 40 and 52 in registry. The indexing means may comprise a pair of locating pins carried by the loading rack which engage in locating holes in the face of the die 36. With the loading rack in the indexed position at the forming and transfer station B, the clad discs $D_c$ are transferred from the die 36 by means of a transfer mechanism 56 located below the die 36 and comprising a platen 58 having a series of transfer pins 60 of a smaller diameter than the die openings 40 and which are operable upon actuation of the pins 60 upwardly to engage the clad discs $D_c$ and transfer them to the loading rack 50. This operation is illustrated in FIGS. 6 and 7. It is noted that the openings 52 in the loading rack are of a diameter slightly less than the diameter of the clad disc, so that the discs are frictionally held in the loading rack in the manner illustrated in FIG. 8. A conventional hydraulic-piston actuator 64 is provided for reciprocating the transfer mechanism. Suitable conventional control circuitry may be provided for effecting predetermined actuation of the punch and die mechanism and transfer mechanism in a controlled synchronized sequence to permit punching and transfer of the discs in the order and manner described above.

A modified form of loading rack is illustrated in FIGS. 12 and 13. Each of the openings 52' in the rack has a pilot portion 53' of circular cross section and a reduced throat section 55' defining a seat 57' for the clad disc $D_c$. The diameter of the pilot portion 53' is preferably equal to, or greater than, the diameter of the clad disc $D_c$ whereby the clad disc is supported in a horizontal position on the seat 57' so that when the discs are ejected from the loading rack into the mold cavity, they are accurately positioned concentrically with respect to the mold axis. This form of loading rack is particularly suited for large diameter clad discs and minimizes the chance of the disc being in a cocked position in the loading rack.

Downstream of the forming and transfer station B, the selvage material comprising the punched sheet $S_1$ may be withdrawn by a pair of draw rolls 68 and 70.

The calender rolls 10a, 10b, and 10c, and the draw rolls 68 and 70, may be operated from a common actuator source, as illustrated, so that the formation and feed of the sheet material through the forming and transfer station B may be intermittently discontinued during the cycling of the punch and die mechanism 29 and the transfer mechanism 56.

Figure 9:
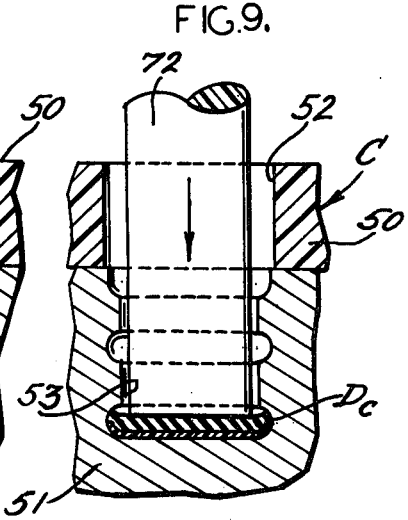

The loaded rack 50 is then transferred either manually, or by suitable automatic means, from the disc forming station B to the mold loading station C whereby the clad discs $D_c$ are positioned in the mold cavities of the lower half of the mold 51 for the finished article. More specifically, as illustrated, the loading rack 50 is positioned over the lower half of the mold cavity so that the center line of the openings in the loading rack are aligned with the center line of the mold cavities (See FIGS. 8 and 9). To this end, the loading rack and lower half of the mold may be provided with suitable indexing means similar to that described in connection with the indexing means of the loading rack and punch die 36. With the rack in the position illustrated, a pin rack 70 comprising a platen 70a with a plurality of depending loading rods 72 is actuated downwardly by means of a piston cylinder actuator 74 to eject the clad discs $D_c$ from the loading rack and position them in the bottom of the cavities 53 of the mold lower half 51 with the Teflon facing the bottom thereof. Locating or indexing means is provided on the mold support table 59 in the form of a ledge 61 confronting, for example, the side and rear of the mold 51 to position the mold in a fixed position relative to the pin rack 70 to insure accurate transfer and positioning of the clad discs $D_c$ in the mold cavities. The diameter $D_1$ of the clad disc $D_c$ is greater than the diameter $D_2$ of the mold cavity adjacent the bottom thereof, so that when the clad disc is seated in the mold cavity, the outer peripheral edge is turned rearwardly as illustrated in FIGS. 9 and 13, thereby to form the return skirt in the molded article.

The loaded mold 51 is then transferred to the molding or vulcanizing station D, and after each of the cavities is charged with an additional predetermined quantity of elastomeric material, the upper mold 55 is lowered by a hydraulic-piston cylinder actuator 57 to close the mold. As is conventional, the mold may be provided with heating elements 51a.

In accordance with the present invention, the elastomeric layer of the clad disc $D_c$ may be vulcanized prior to insertion in the mold cavity at the molding station C, and prior to charging the mold cavity with additional quantities of uncured elastomeric material to form the finished article. In the system illustrated in FIG. 1, this may be accomplished by curing the laminated sheet $S_1$ before the sheet is delivered to the disc forming and transfer station B. This would involve an additional step in the process which may be performed at a first curing station between the supply station A and disc forming and transfer station B wherein the laminated sheet $S_1$ is cured, for example, by passing it through a pair of rollers to apply heat and pressure to the sheet for a given length of time to affect the curing. Alternatively, the laminated sheet $S_1$ may be cured by pressing it between heated platens under controlled time and temperature conditions to affect the curing. It has been found that color coding may be controlled more accurately by curing the elastomeric layer of the clad disc prior to the final molding process since the cured layer which may contain the coloring agent has less tendency to homogenize with the cured charge of elastomeric material added during the final molding step. Further, it has been found that a good bond results between the Teflon and the elastomeric material.

There is illustrated in the FIGS. 16, 17 and 18 a modified form of clad disc transfer and loading mechanism in accordance with the present invention which would obviate the need for a loading rack in the system illustrated in FIG. 1 and described above.

The clad disc transfer and loading mechanism which is generally designated by the numeral 169 includes a platen 171 which mounts a plurality of depending rods 172 corresponding in number to the number of openings in the punch die 136. The transfer and loading mechanism 169 is adapted to pick up clad discs $D_c$ at the forming station B and to transfer the clad discs to the mold loading station C and directly position the discs in the mold cavities of the lowerhalf of the mold 51. To this end, the platen 171 has formed therein a manifold 176 having an outlet port 178 and an inlet port 179 which are connected through lines 180, 181, control valves 182, 183 and branch lines 184 and 186 to a vacuum source (not shown) and air pressure supply source (not shown) respectively. Each of the rods 172 has an axial bore 192 communicating at one end with the manifold 176 and terminating at the free axial end of the rod in a plurality of smaller openings 194.

To facilitate movement between stations B and C, the transfer and loading mechanism 169 may be supported in a guide rail structure and means provided for actuation of the mechanism between the disc forming station B and mold loading station C. Limit stops at spaced locations may be provided on the guide rail to insure proper registry of the transfer and loading mechanism relative to the die 136 and mold 51 so that the rods 172 are in precise registry with the die openings and mold cavities at each station.

In the operation of the modified transfer and loading mechanism 169, the punch 29 may be mounted on a conventional guide rail structure (not shown) extending transversely to the line of movement of the material through the system to permit lateral displacement of the punch 29 when the transfer and loading mechanism 169 is moved to station A. In the punch die 136 in the modified system the die openings 140 have a bottom wall 137.

Considering now briefly the operation of the method incorporating the modified disc transfer and loading mechanism 169, as the laminated sheet $S_1$ enters the clad disc forming station B, the transfer and loading mechanism 169 is located at the mold loading station and the punch 29 overlie the die 136 at the clad disc forming station B. The punch 29 is then reciprocated by the actuator 38 to form the clad discs in the die 136. The punch 29 is then moved transversely of the line and transfer and loading mechanism 169 is moved to its forward limit position overlying the die 136 (shown in broken lines in FIG. 16). In this position the manifold 176 is connected to the vacuum source through control valve 182 whereby as the transfer mechanism is displaced downwardly by actuator 74, each clad disc is bottomed against the bottom wall of the die cavity and as the transfer mechanism is retracted by actuator 74, the clad discs $D_c$ are retained on the axial end face of the rods 172. The transfer and loading mechanism is then moved to the mold loading station C. The transfer and loading mechanism 169 is then lowered to position clad discs carried by the rods 172 in the mold cavities of the mold 51 and as the rods bottom the discs in the mold cavity, the control valve 182 is operated to connect the manifold 176 to air pressure supply to release the clad discs and permit retraction of the transfer and loading mechanism. It is noted that the various piston-cylinder actuators used in the system are of conventional construction and that conventional control means may be used for cycling the actuators to effect operation of the various mechanisms in the manner and sequence described above.

The precise nature of the attachment between the elastomeric material and the inert Teflon liner is theorized to be a physical bond extending throughout the interface of the materials occasioned at least in part by the static cling inherent in the etched surface of the Teflon. Some adhering forces could be attributable to the heat and pressure of vulcanization. In the specific embodiments, the rubber layer of the clad disc $D_c$ supports the Teflon in intimate contact with the mold cavity during vulcanization so that the return skirt in the molded article is smooth about its periphery and substantially devoid of wrinkles or other surface irregularities. It is noted that in the system illustrated in FIG. 1 and described above, the laminated sheet material $S_1$ is continuously fed from the supply station through the forming and transfer station B. The system also encompasses the use of individual segments of laminated sheet material $S_1$ which may be formed in a separate operation and positioned in the forming station manually and wherein the selvage is removed after the cycling of the punch and die mechanism 36 and the transfer mechanism 56.

There is illustrated in FIGS. 3 and 15, a closure type stopper made in accordance with the present invention. The stopper which is generally designated by the numeral 80 includes a top section 82 and a plug portion 84 depending from the top and smaller diameter and a clad disc $D_c$ comprising a layer of rubber 87 molded to the lower axial end face of the stopper and an outer liner 89 of inert material such as Teflon, laminated to the layer 87, the liner having a disc-like face 91 and an annular return skirt 93 adapted to snugly engage the inner wall of a container when assembled thereto. The stopper is adapted for use in a container 90 for a medicament and is held in place by an outer cap assembly 92 which has a detachable central disc portion 94 to expose the central portion of the stopper for insertion of a hypodermic syringe to withdraw the contents in the container. As illustrated, the top of the stopper overlies the axial end face of the container, and the plug snugly engages in the opening of the container with the return skirt 93 of the liner 89 providing an inert barrier between the rubger portion of the stopper and the contents of the container.

There is illustrated in FIG. 11 another article made in accordance with the present invention which is a piston plunger for use, for example, in a syringe of the type illustrated in FIG. 2. The syringe which comprises an outer container or barrel 100 for a medicament normally closing the discharge opening at the discharge end of the syringe which may be made of Teflon and a hub 102 for supporting a needle 104. The piston plunger for the container comprises as illustrated, a body portion 106 made of rubber and including a series of annular, radially outwardly directed ribs 107 which are axially spaced along the length of the body portion 106, a clad disc $D_c$ consisting of a layer of rubber 108 molded to the lower axial end face of the body portion 106, and an outer liner 110 of inert material, such as Teflon, bonded to the layer 108. The liner has a disc-like face 112 and an annular return skirt 114. When the piston plunger is inserted in the container, the skirt 114 snugly engages the side wall of the container to provide an inert barrier between the medicament and the rubber body portion of the piston plunger. The return skirt 114, as illustrated, extends around the lowermost rib $107_1$ at least to a tangent point on the radius of the rib $107_1$.

This invention will be more particularly described by the following examples which are set forth for purpose of illustration only are are not to be construed as limiting the invention in any way.

EXAMPLE 1

A stopper type closure was prepared by laminating a continuous sheet of uncured natural rubber containing vulcanizing agents and accelerators approximately 0.05 inches thick and 9 inches wide to one face of a sheet of Teflon film 0.002 to 0.003 inches thick available from E. I. du Pont de Nemours as FEP type 200 C, said one face of Teflon being chemically etched prior to lamination. A plurality of clad discs were formed from the laminated sheet in the manner described hereinabove which were positioned in a mold cavity with the Teflon layer facing the bottom thereof in the manner described above. An additional quantity of the uncured natural rubber was added to the mold cavity and the mold closed. The mold was then heated to 290° to 310° F. for about 8 to 11 minutes to cure the uncured rubber in accordance with conventional vulcanization procedures. Stopper type closures having a Teflon facing adhering to the axial end face of the plug portion thereof and a return skirt were thus prepared (see FIG. 15).

EXAMPLE 2

Following the procedure outlined in Example 1, a stopper type closure was prepared by laminating a continuous sheet of uncured butyl rubber containing vulcanizing agents and accelerators approximately 0.05 inches thick and 9 inches wide to one face of a sheet of Teflon film 0.002 to 0.003 inches thick available from E. I. du Pont de Nemours as FEP type 200 C, said one face of Teflon being chemically etched prior to lamination. A plurality of clad discs were formed from the laminated sheet in the manner described hereinabove which were positioned in a mold cavity with the Teflon layer facing the bottom thereof in the manner described above. An additional quantity of the uncured butyl rubber was added to the mold cavity and the mold closed. The mold was then heated to 310° to 330° F. for about 6 to 10 minutes to cure the uncured butyl rubber in accordance with conventional vulcanization procedures. Stopper type closures having a Teflon facing adhering to the axial end face of the plug portion thereof and a return skirt (see FIG. 15) were thus prepared.

EXAMPLE 3

A stopper type closure was prepared by laminating a continuous sheet of uncured butyl rubber containing vulcanizing agents and accelerators approximately 0.05 inches thick and 9 inches wide to one face of a sheet of Teflon film 0.002 to 0.003 inches thick available from E. I. du Pont de Nemours as FEP type 200 C, said one face of Teflon being chemically etched prior to lamination. The laminated sheet was then positioned between metal platens and heated a temperature from 310° to 330° F. for about 6 to 10 minutes to cure the uncured butyl rubber. A plurality of clad discs were formed from the cured laminated sheet in the manner described hereinabove which were positioned in a mold cavity with the Teflon layer facing the bottom thereof in the manner described above. An additional quantity of the uncured butyl rubber was added to the mold cavity and the mold closed. The mold was then heated to 310° to 330° F. for about 6 to 10 minutes to cure the uncured butyl rubber and in accordance with the conventional vulcanization procesures cause to adhere to the previously cured clad disc. Stopper type closures having a Teflon facing adhering to the axial end face of the plug portion thereof and a return skirt (see FIG. 15) were thus prepared.

EXAMPLE 4

Following the procedure and utilizing the materials outlined in Examples 1 through 3 above, piston plungers were prepared having a Teflon facing adhering to the axial end face of the plunger portion thereof and a return skirt (see FIG. 11).

Following the procedure outlined in Example 3, a molded article was prepared in which a red coloring agent was included in the uncured butyl rubber formulation making up the cured clad disc. The uncured butyl rubber added to the mold cavity containing the cured clad disc was formulated with a black coloring agent. On final curing, some cross-migration of the coloring materials occurred at the line of demarcation between the clad disc and the additional butyl rubber with the result that the articles produced had a marbleized appearance where the coloring materials comingled at the interface of the clad disc and the additional butyl rubber.

FIGS. 11 and 15 depict articles made in accordance with Example 5, in which a line of demarcation between the clad disc portion and the body portion is apparent, albeit the line of demarcation which actually occurs in articles made in accordance with Example 5 may not be as pronounced as shown in the figures. In the event that a coloring agent is included in both portions of material used in formulating the articles such as described in Examples 1 and 2, it can be appreciated that the resultant article will have a uniform color if identical coloring agents are included in the materials making up both the clad disc portion and the body portion of the article. Likewise, if different coloring agents included in the materials making up the clad disc portion and the body portion of the article, the resultant article will have a marbleized appearance due to some migration of the colored materials during curing. In any event, regardless of the method of preparation used and regardless of whether coloring material is present in the materials making up the clad disc portion and the additional material used in formulating the body portion of the article, there is a discernable line of demarcation between the clad disc portion and the body portion of the article. This line of demarcation is shown particularly in FIGS. 11 and 15.

We claim:

1. Apparatus for handling a plurality of clad elements of a predetermined configuration formed from a sheet consisting of a layer of an elastomeric material bonded to a layer of inert material and deposited in openings of a die corresponding in number and arrangement to cavities of a mold comprising a transfer mechanism having a plurality of rods having a pickup face with at least one fluid port, said rods corresponding in number and array to the die openings and mold cavities, means for selectively connecting said fluid port to a source of vacuum to retain a clad element on said pickup face when it engages the element in the die openings and to an air pressure source to discharge the clad element in the cavity of a mold, and a reciprocating punch having a plurality of punch rods for forming the clad elements from the sheet material and depositing them in the openings of the die and wherein said die and mold are positioned adjacent one another and said transfer mechanism includes means mounting it for translating movement between a first position overlying said die with the punch rods aligned with the die openings and a second position overlying the mold with the pickup rods aligned with the mold cavities.

2. Apparatus as claimed in claim 1 wherein said punch mechanism is adapted for movement in timed sequence with the translating movement of said transfer mechanism between said first and second positions and is disposed out of the path of said transfer mechanism when it is in said first position.

3. Apparatus as claimed in claim 1 wherein said transfer mechanism includes a hollow platen defining a manifold communication with said pressure and vacuum source and wherein said rods depend from said platen and are in fluid communication with said manifold.

* * * * *